Oct. 17, 1933.    C. R. SNYDER    1,930,961
MOTOR VEHICLE BRAKE OPERATING MECHANISM
Filed Dec. 19, 1930
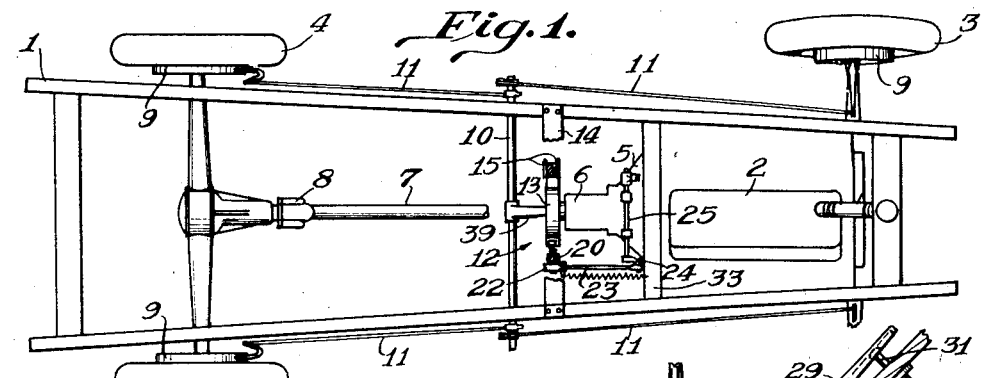

Patented Oct. 17, 1933

1,930,961

UNITED STATES PATENT OFFICE 1,930,961

MOTOR VEHICLE BRAKE OPERATING MECHANISM

Charles Ranney Snyder, Miami, Fla.

Application December 19, 1930
Serial No. 503,532

4 Claims. (Cl. 188—140)

This invention relates to improvements in brake actuating mechanism for motor vehicles, and has for its primary object the provision of improved means whereby the movement of the vehicle in connection with which the mechanism is mounted is employed for the purpose of effecting the application of the vehicle brakes. Heretofore motor vehicle brake members have been to a very large degree actuated by the physical strength of the operator, although I am aware of the fact that it has been proposed to operate brakes on motor vehicles by the employment of superatmospheric and subatmospheric pressures in fluid controlled systems. However, in the present invention I provide a mechanical brake applicator which may be operated by the slightest degree of pressure on the part of the vehicle operator and wherein the force necessary to effect a quick and positive actuation of the vehicle brakes is supplied by the inertia of the moving vehicle, the slightest degree of movement on the part of the vehicle serving to provide for the quick and positive setting of the brakes.

It is another object of the invention to provide means for applying the motor vehicle brakes which is at all times under the control of the vehicle operator. Usually, in motor vehicle operation it is customary, in the braking of the vehicle, for the operator to transfer his right foot from the accelerator pedal to the ordinary brake pedal. This is a movement which while in most cases is accomplished instinctively and with considerable rapidity yet there is an appreciable interval of time involved in the transferring of the foot from the accelerator pedal to the brake pedal, and then depressing the brake pedal manually to apply the brakes. In accordance with the present invention there is associated with the accelerator pedal the manual control for governing the operation of the mechanical brake actuating means comprising the present invention, whereby the operator of the vehicle may without appreciably changing the position of his right foot control selectively either the operation of the accelerator or the operation of the brake applying means to the end of obtaining prompt and complete control of the movements of the vehicle and in a much faster and more convenient manner than can be done with customary vehicle controls.

My present invention is particularly useful in connection with motor vehicles which have recently appeared on the market using what is known as an "over-running" clutch in the speed transmission box, wherein the engine is disconnected from the propeller shaft when the accelerator pedal is raised. This type of transmission is popularly known as the "free-wheeling" type. While this type of transmission has many advantages over the customary clutch control type, yet it involves considerably more frequent application of the vehicle brakes, for the reason that when the accelerator pedal is released the vehicle coasts until the brakes are applied and the accelerator pedal again depressed. In heavy traffic this means a constant shifting of the right foot from the accelator pedal to the brake pedal. By the employment of the control mechanism comprising the present invention the accelerator and brake mechanisms may be operated without appreciably altering the position of the driver's foot with relation to the accelerator control, whereby instant stopping or deceleration of the vehicle may be secured or corresponding promptness obtained in effecting its acceleration.

In accordance with the present invention I provide a brake control unit which consists of a driving member rotatably carried by the propeller shaft of a motor vehicle and mounted to rotate in unison with said shaft, and I provide a coacting member which is engageable at will with the driving member by the use of an easily actuated foot control, whereby said co-acting member will be given a desired degree of rotary movement by frictional engagement with the driving member, the degree of movement of the co-acting member being sufficient to effect quickly and positively the application of the vehicle brakes.

It is another object of the invention to provide a brake control mechanism of the character specified which may be safely and reliably operated at all motor vehicle speeds, and wherein deceleration of the motor vehicle is accomplished with substantially a complete absence of "grab", jar or irregularity. Further, the mechanism is such as to provide for the operation of the brake applying means when the vehicle is moving at extremely low speeds in either a forward or rearward direction.

With these and other objects in view, which will appear as the description proceeds, the invention consists in the novel features of construction, combinations of elements and arrangements of parts hereinafter to be more fully described and pointed out in the appended claims.

In the accompanying drawing:

Figure 1 is a top plan view of a motor vehicle equipped with the brake operating mechanism comprising the present invention, Figure 2 is a vertical longitudinal sectional view on an enlarged scale taken through the vehicle and associated brake operating mechanism, Figure 3 is a transverse vertical sectional view, Figure 4 is a detailed transverse sectional view on the line 4—4 of Figure 3, Figure 5 is a similar view on the line 5—5 of Figure 3, Figure 6 is a transverse sectional view on the line 6—6 of Figure 3.

Referring more particularly to the drawing, the numeral 1 designates the frame of a motor vehicle. The engine of the vehicle is indicated at 2, the forward or steering wheels at 3, and the rear or driving wheels by the numeral 4. The clutch casing is designated by the numeral 5 and a standard transmission or gear box is indicated by the numeral 6. The driven or propeller shaft leading from the transmission is indicated by the numeral 7 and this shaft is provided with the usual universal joint 8. The wheels 3 and 4 are equipped with the customary brake mechanism 9 which may be of any standard form and, as usual, this brake mechanism is operated by a rock shaft 10 journaled in connection with the frame 1. The outer ends of the rock shaft are equipped with cranks which are connected by means of cables or rods 11 with corresponding cranks constituting a part of the brake mechanisms 9. Inasmuch as the brake mechanism used in connection with said brake means may be of any standard design it has not been deemed necessary to illustrate any particular form of such mechanism.

Mounted on the forward end of the propeller shaft 7 immediately to the rear of the transmission casing 6 is the brake applying unit 12 comprising the present invention. In the specific embodiment of this unit which has been selected for purposes of illustration and description, although it will be understood at this juncture that this unit is but merely one of many possible forms, the numeral 13 designates the driving member. The driving member consists of a wheel having a flanged periphery, the hub of the wheel being keyed or otherwise secured to the propeller shaft to positively rotate in unison therewith. Carried by the frame 1 is a stationary cross bar 14 which passes over the top of the wheel 13. This cross bar is provided with a lug to which is attached pivotally mounted depending links 15, the lower ends of said links being pivotally connected with one end of a yoke 16. As shown in Figures 3 and 4 this yoke carries a plurality of horizontally journaled rollers 17 which support and engage with a brake actuating member 18 which consists in this instance of a semi-circular metallic band faced on one side with a brake lining 19 of asbestos or similar material, and this lining is adapted to be brought into engagement with the flanged periphery of the wheel 13 when the yoke is elevated by a manual means hereinafter described. When the actuating member 18 is brought into frictional engagement with the wheel 13 the actuating member tends to turn in unison with said wheel, and this limited movement on the part of the actuating member 18 on the drive from the power of the vehicle itself is applied for the purpose of applying the brakes, the manual effort used by the operator in attaining this object being merely that which is required to elevate the yoke and to hold the member 18 in frictional engagement with the wheel 13.

To govern the raising and lowering of the yoke, the cross bar 14 is provided with a depending bearing 20 in which is rotatably mounted a shaft 21. The outer end of this shaft is equipped with an adjustable crank arm 22 which has its outer end pivotally connected to one end of a rod 23. The other end of the rod is pivotally connected to a crank arm 24 mounted on a horizontally journaled shaft 25 arranged immediately below the floor board 26 of the motor vehicle. The shaft 25 is suitably supported for rocking movement in bearings and carries at its end opposite to the arm 24 a second crank arm 27 which in turn is connected with a short stem 28 which leads to the lower part of a combined accelerator and brake pedal 29. This pedal is pivotally mounted as at 30 on the upper portion of the floor board 26, and the upper end of the pedal engages as usual with a throttle control 31 which leads to the carburetor (not shown) of the engine. A spring 32 is connected in this instance with one of the cross struts 33 of the frame 1 and with the crank arm 22 and normally serves to hold the yoke positively in a lowered position and to require some degree of pressure on the part of the vehicle operator in operating the pedal 29 to apply the brakes.

It will be seen that by depressing the pedal 29 with the heel of the right foot, the shaft 25 will be partially rotated and likewise the shaft 21. This rotary movement of the shaft 21 is imparted to an eccentric 34 rigidly carried thereby, the eccentric being equipped with a pin 35 which is connected with the end of the yoke 16 opposite to the link 15. Thus, the rotation of the pin 35, which is eccentric to the axis of the rotation of the shaft 21, results in raising the yoke so that all of the rollers 17 of the latter uniformly press upon the actuating member 18 to force the lining surface of the latter into frictional engagement with the flanged periphery of the driving wheel or member 13, whereby to obtain limited turning movement of the actuating member in unison with the wheel.

The lower central portion of the actuating member 18 is pivotally connected as at 36 with a depending rod 37, the latter being provided centrally with a turn-buckle 38 by which the effective length of the rod 37 may be controlled. The lower end of the rod 37 connects with a crank arm 39 having its hub fixed to the rock shaft 10. The lower central portion of the yoke 16 is provided with an arcuate slot 41 which receives the pivoted connection between the upper portion of the rod 37 and the member 18.

In operation, when it is desired to apply the brakes of the vehicle the accelerator pedal 29 is depressed with the heel of the operator's right foot. This results in rotating the shaft 21 against the resistance offered by the spring 32, the rotation of said shaft serving to elevate the yoke and bring the member 18 in frictional contact with the rotating driving wheel 13. The frictional engagement thus set up is sufficient, at all speeds of motor vehicle operation, to partially rotate the actuating member 18 and this partial rotation of the actuating member results in upward movement on the part of the rod 37 and the consequent oscillation of the rock shaft 10 through the medium of the arm 39. The movement of the rock shaft 10 is then imparted to the brake mechanisms 9 carried in conjunction with the vehicle wheels, the latter operating in the usual manner to bring the vehicle to a standstill. When the accelerator pedal is released or removed from engagement with the heel of the operator's foot, the spring 32 returns the parts to a normal position, releasing the brakes.

In view of the foregoing it will be seen that the present invention provides simple yet effective means for controlling the application or operation of the brake mechanism of a motor vehicle. It will be observed that the brakes are applied by the movement of the vehicle itself, since whenever the vehicle is in motion the driving member 13 will also be in a state of rotation and no matter how slightly or how slowly the wheel 13 rotates, its very motion is sufficient to set the brakes when its periphery is engaged by the member 18. Due to the fact that I use the inertia of the vehicle itself in effecting the application of the brakes, the manual control involved in the raising of the yoke 16 is a very simple matter and may be very easily effected. Mere finger pressure applied to the lower end of the pedal 29 will be sufficient to quickly and efficiently apply the brakes. However, I have found it advisable to use the spring resistance, shown at 32, in order to offer the operator a sufficient resistance to prevent unnecessarily quick application of the brakes. It will be appreciated that by combining in one control the accelerator and brake actuating means I permit the motor vehicle to be at all times under the convenient control of the operator insofar as acceleration and deceleration of the vehicle speeds are concerned. It will be understood that by the arrangement of the parts of the unit 12, shown in Figure 3, the said unit is operable either when the vehicle is proceeding forwardly or when in reverse. Due to the fact that the driven member of the unit 12 turns by frictional contact with the driving member, the said unit is safe to operate quickly at all speeds, particularly high speeds. There is no tendency on the part of the vehicle so equipped to become unmanageable when the brakes are partially applied with the vehicle moving ahead at high speeds. The pull exerted by the unit 12 on the brake mechanism is substantially constant or uniform at all speeds, and I attribute the safety of the device largely to this fact. My brake applying means may be used either solely or in conjunction with the customary motor vehicle foot brake.

It is manifest that the invention may assume any of several different forms and therefore I do not limit myself to the particular mechanism herein disclosed but reserve the right to employ all such modifications and variations thereof as may be said to fall fairly within the scope of the following claims.

What is claimed is:

1. The combination with the wheel brakes, chassis and drive shaft of an automotive vehicle, of servo brake operating means comprising, in combination, a rotor element drivably connected to said drive shaft, brake actuating means mounted adjacent said rotor element, means secured at one of its ends to said chassis and adapted to force said brake actuating means into frictional contact with said rotor element, manually operable means for operating said second mentioned means, and means interconnecting said brake actuating means and wheel brakes.

2. The combination with the wheel brakes, accelerator, chassis and drive shaft of an automotive vehicle, of servo brake operating means comprising, in combination, a rotor element drivably connected to said drive shaft, brake actuating means mounted adjacent said rotor element, means comprising a yoke member secured at one of its ends to said chassis and adapted to force said brake actuating means into frictional contact with said rotor element, an accelerator controlled manually operable means for operating said second mentioned means, and means interconnecting said brake actuating means and wheel brakes.

3. The combination with the wheel brakes, chassis and drive shaft of an automotive vehicle, of servo brake operating means comprising, in combination, a rotor element drivably connected to said drive shaft, an annular brake actuating means mounted concentric with said rotor element, means secured at one of its ends to said chassis and adapted to force said brake actuating means into frictional contact with said rotor element, manually operable means for operating said second mentioned means and connected to one end thereof, and means interconnecting said brake actuating means and wheel brakes.

4. The combination with a brake operating cross shaft, the chassis and the drive shaft of an automotive vehicle, of servo brake operating means comprising, in combination, a rotor element drivably connected to said drive shaft, an annular brake actuating means mounted concentric with said rotor element, means comprising a yoke member secured at one of its ends to said chassis and adapted to force said brake actuating means into frictional contact with said rotor element, manually operable means for operating said second mentioned means, and means interconnecting said brake actuating means and cross shaft, said last metioned means comprising linkage interconnecting the center portion of said brake actuating means and the center of said cross shaft.

CHARLES RANNEY SNYDER.